(12) United States Patent
Dai et al.

(10) Patent No.: US 11,378,441 B2
(45) Date of Patent: Jul. 5, 2022

(54) COLLABORATIVE WEIGHING AND MEASURING SYSTEM AND METERING SYSTEM

(71) Applicants: Mettler-Toledo (Changzhou) Precision Instruments Co., Ltd., Changzhou (CN); Mettler-Toledo (Changzhou) Measurement Technology Co., Ltd., Changzhou (CN); Mettler-Toledo International Trading (Shanghai) Co., Ltd., Shanghai (CN)

(72) Inventors: Feng Dai, Changzhou (CN); Jianqiang Yang, Changzhou (CN); GuoJun Xie, Changzhou (CN); Jinquan Yu, Changzhou (CN); Wenming Mao, Changzhou (CN); Dake Tan, Changzhou (CN)

(73) Assignees: Mettler-Toledo (Changzhou) Precision instruments Co., Ltd., Changzhou (CN); Mettler-Toledo (Changzhou) Measurement Technology Co., Ltd., Changzhou (CN); Mettler-Toledo International Trading (Shanghai) Co., Ltd, Shanghai (CN)

( * ) Notice: Subject to any disclaimer, the term of this patent is extended or adjusted under 35 U.S.C. 154(b) by 135 days.

(21) Appl. No.: 16/500,684

(22) PCT Filed: Apr. 3, 2018

(86) PCT No.: PCT/CN2018/081694
§ 371 (c)(1),
(2) Date: Oct. 3, 2019

(87) PCT Pub. No.: WO2018/188498
PCT Pub. Date: Oct. 18, 2018

(65) Prior Publication Data
US 2020/0116548 A1 Apr. 16, 2020

(30) Foreign Application Priority Data

Apr. 12, 2017 (CN) .......................... 201710235293.5

(51) Int. Cl.
*G01G 19/393* (2006.01)
*G01G 23/37* (2006.01)

(52) U.S. Cl.
CPC ....... *G01G 19/393* (2013.01); *G01G 23/3735* (2013.01)

(58) Field of Classification Search
CPC .................... G01G 19/393; G01G 23/3735
See application file for complete search history.

(56) References Cited

U.S. PATENT DOCUMENTS 4,658,919 A * 4/1987 Nobutsugu ............ G01G 19/42
177/1
4,804,052 A * 2/1989 Griffen ................ G01G 19/021
177/25.14
(Continued)

FOREIGN PATENT DOCUMENTS

CN 202793571 U 3/2013
CN 203259229 U 10/2013
(Continued)

*Primary Examiner* — Randy W Gibson
(74) *Attorney, Agent, or Firm* — Standley Law Group LLP; Jeffrey S. Standley; Stephen L. Grant

(57) ABSTRACT

The present invention discloses a weighing and measuring system, comprising a weighing sensor network constituted by networking a plurality of weighing sensors, wherein in the weighing sensor network, each of subtasks into which a weighing task is split is assigned to each of weighing sensors in the weighing sensor network; and each of the weighing sensors respectively and independently executes the assigned subtask and exchanges task data through the weighing sensor network. The weighing sensors collaboratively process a weighing task, which no longer depends on
(Continued)

an instrument or a computer, thereby reducing the cost of the whole system, and improving the tolerance level to environment. The collaborative processing mode also avoids the bottleneck of data communication information summarization.

14 Claims, 2 Drawing Sheets

(56) References Cited

U.S. PATENT DOCUMENTS

| | | | | |
|---|---|---|---|---|
| 4,901,237 A * | 2/1990 | Hikita | ............... | G01G 19/4144 177/25.15 |
| 5,076,375 A * | 12/1991 | Dillon | ............... | G01G 3/1406 177/45 |
| 5,296,655 A * | 3/1994 | Sargent | ............... | G01G 23/163 177/199 |
| 5,981,881 A * | 11/1999 | Kawanishi | ........... | G01G 19/393 177/25.18 |
| 6,046,411 A * | 4/2000 | Kawanishi | ........... | G01G 19/393 177/25.13 |
| 6,566,613 B1 * | 5/2003 | Gesuita | ............... | G01G 19/393 177/25.18 |
| 6,576,849 B2 * | 6/2003 | Bliss | ...................... | G01G 23/01 177/199 |
| 6,833,514 B2 * | 12/2004 | Gesuita | ............... | G01G 19/393 177/25.18 |
| 7,211,748 B2 * | 5/2007 | Lauke | ................... | G01G 3/147 177/199 |
| 9,601,821 B2 | 3/2017 | Zhang et al. | | |
| 9,970,810 B2 * | 5/2018 | Xie | ........................ | G01G 23/01 |
| 10,527,486 B2 * | 1/2020 | Wechselberger | ...... | G01G 23/01 |
| 2015/0268089 A1 * | 9/2015 | Xie | ........................ | G01G 23/00 702/101 |

FOREIGN PATENT DOCUMENTS

| | | |
|---|---|---|
| CN | 103942098 A | 7/2014 |
| CN | 104731663 A | 6/2015 |
| CN | 106257960 A | 12/2016 |

* cited by examiner

COLLABORATIVE WEIGHING AND MEASURING SYSTEM AND METERING SYSTEM

TECHNICAL FIELD

The present invention relates to a weighing and measuring system and a metering system, in particular to a collaborative weighing and measuring system and a metering system.

BACKGROUND ART

At present, in the field of weighing and measuring, a circuit having a high-precision analog-to-digital conversion function and digital processing capability is built in weighing sensors to convert the load force of the weighing sensor into a digital signal, each of the weighing sensors communicatively exchanges data and instructions with an instrument or a computer, which is used for final processing and display.

That is to say, a plurality of weighing sensors are typically configured to acquire signals in the existing weighing system, and then data is communicatively transmitted to an instrument or a computer for summarization and analysis. Such a weighing system is complicated and high in cost.

Moreover, the tolerance level to environment of the computer or instrument is lower than that of the weighing sensor. Thus, when the instrument or computer fails, the entire weighing system is unable to operate.

In order to avoid the influence from the instrument or computer on the weighing system, provided in the prior art is also a weighing system composed of master and slave weighing sensors, wherein the instrument or computer is functionally replaced by the specially constructed master weighing sensor, thereby improving the tolerance level to environment of the entire weighing system.

Although the instrument or computer is dispensed with in this solution, the basis of the solution is still implementation of the function of the instrument by using the specifically constructed master weighing sensor, so that when the master weighing sensor fails, the ire weighing system is also unable to operate. In addition, since the other weighing sensors all need to communicate with the master weighing sensor, huge and frequent data communication makes it impossible to avoid the bottleneck of information summarization in the weighing system.

SUMMARY OF THE INVENTION

The technical problem to be solved by the present invention is to overcome the defects, in the prior art, such as the reliance of a weighing system on an instrument, and the bottleneck of communication information summarization, and to provide a collaborative weighing and measuring system and a metering system, which implement collaborative processing of the weighing task by the weighing sensors through the weighing sensor network and the splitting and assignment of the weighing task, and, in addition to dispensing the reliance of the system on an instrument or a computer, also solving the bottleneck of information summarization.

The present invention solves the above technical problem by the following technical solutions:

the present invention provides a weighing and measuring system, wherein the measuring system comprises a weighing sensor network constituted by networking a plurality of weighing sensors, wherein in the weighing sensor network, each of subtasks into which a weighing task is split is assigned to each of the weighing sensors in the weighing sensor network;

and each of the weighing sensors respectively and independently executes the assigned subtask and exchanges task data through the weighing sensor network.

In the present invention, a weighing task is split and collaboratively executed by, weighing sensors on each node of a weighing sensor network, so that information summarization is reduced, the bottleneck of communication is avoided, and the weighing system no longer relies on an instrument to execute the weighing task.

Moreover, the weighing sensor network is constructed such that failure of any one of or a number of weighing sensors does not affect communication between other weighing sensors in the network.

Preferably, the weighing sensors are networked via a bus to constitute the weighing sensor network.

In the present invention, the construction of the weighing sensor network is realized via a bus, and the each of the weighing sensors can collaboratively complete a weighing task through bus communication, thereby realizing the function of an instrument.

Preferably, in the weighing sensor network, when failure of a weighing sensor to which a subtask is assigned is monitored, the subtask of the weighing sensor is assigned to another weighing sensor in the weighing sensor network.

In the present invention, the reliability of the system is improved by reassignment of subtasks.

Preferably, the measuring system splits the weighing task according to a preset splitting rule to obtain the subtasks.

In the present invention, the splitting of the weighing task is implemented by setting a splitting rule. Moreover, different splitting rules may be flexibly set in the present invention to implement customized task splitting.

Preferably, the measuring system acquires a serial number of each of the weighing sensors in the weighing sensor network, and assigns, according to a preset assignment rule, each of the subtasks into which the weighing task is split to the weighing sensor with a corresponding serial number.

In the present invention, the subtasks obtained after being split are assigned to each of the weighing sensors by setting an assignment rule. That is to say, different assignment rules may be flexibly set in the present invention to implement customized task assignment.

Preferably, the preset assignment rule is a redundant assignment rule.

The redundant assignment rule refers to that, when a task is assigned, the same subtask may be assigned to different weighing sensors, thereby realizing redundant assignment, which avoids reassignment due to in failure of the very weighing sensor, and preferentially selects the processing result.

Preferably, the measuring system acquires a serial number of each of the weighing sensors that is broadcast in the weighing sensor network.

In the present invention, by broadcasting the weighing sensors, the active weighing sensors in the weighing sensor network are collected.

Preferably, a weighing sensor is selected from the weighing sensor network according to a preset selection rule, to be used as a service preparation sensor to acquire the serial number of each of the weighing sensors.

Preferably, when the service preparation sensor is down, again another weighing sensor is selected from the weighing sensor network according to the preset selection rule to be used as a service preparation sensor to acquire the serial number of each of the weighing sensors.

Preferably, a weighing sensor with the minimum serial number is selected from the weighing sensor network to be used as the service preparation sensor.

Preferably, the service preparation sensor further selects a weighing sensor from the weighing sensor network according to a preset rule to be used as a service organization sensor to execute splitting and assignment of the weighing task, and to push the subtasks obtained by splitting to the corresponding weighing sensors.

Preferably, when the service organization sensor is down, the service preparation sensor further selects another weighing sensor from the weighing sensor network according to the preset rule to be used as a service organization sensor.

Preferably, the assignment rule is determined for each of the weighing sensors in the weighing sensor network according to a preset negotiation mechanism, and each of the subtasks is assigned to the weighing sensor with the corresponding serial number according to the assignment rule.

Due to the network characteristics of the weighing sensor network, in the present invention, a task assignment mechanism is implemented among the weighing sensors with a network negotiation mechanism.

Preferably, each weighing sensor to which a subtask is assigned activates, based on content of the assigned subtask, a functional module corresponding to the content in the weighing sensor;

each weighing sensor to which the subtask is assigned also independently executes the assigned subtask by means of the activated functional module, and exchanges task data with other weighing sensors through the weighing sensor network.

Because the content of the task is different, the task typically does not need all functions of the weighing sensors. Thus, the functional module is activated in the present invention to customize each weighing sensor to a processing mode corresponding to the task obtained by the weighing sensor.

In the present invention, also provided is a metering system, comprising one or more weighing and measuring systems as described above, each weighing and measuring system being communicatively connected to constitute a metering system network.

Preferably, any of the weighing and measuring systems is capable of assigning some of subtasks into which a weighing task is split to other weighing and measuring systems for processing, and exchanging task data through the metering system network.

The positive and progressive effects of the present invention are as follows:

The weighing sensors collaboratively process a weighing task, which no longer depends on an instrument or a computer, thereby reducing the cost of the whole system, and improving the tolerance level to environment. The collaborative processing mode also avoids the bottleneck of data communication information summarization.

In the present invention, the assignment of the weighing task also improves the reliability of the system, and failures of some weighing sensors will not affect system performance of the entire weighing sensor network on the weighing task.

BRIEF DESCRIPTION OF THE DRAWINGS

The above-mentioned and other features, properties and advantages of the present invention will become more apparent from the following description of the embodiments with reference to the accompanying drawings, and the same reference numerals denote the same features throughout the figures, in which.

DETAILED DESCRIPTION OF PREFERRED EMBODIMENTS

Figure 1:
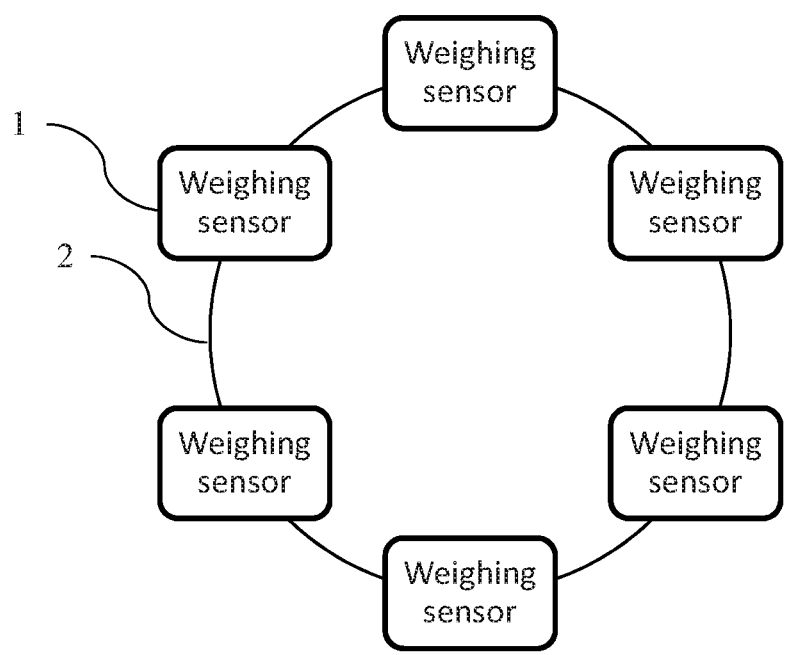
FIG. 1 is a schematic structural diagram of a ring weighing sensor network according to Embodiment 1 of the present invention.

To make the above objectives, features and advantages of the present invention more apparent and easier to understand, specific embodiments of the present invention will be described in detail below with reference to the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the figures denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the present invention must be understood, not simply by the actual terms used but also by the meanings encompassed by each term.

A weighing sensor network, e.g., a daisy-chain-like, star-shaped or tree-like network, or the like, is constructed via a bus in the weighing and measuring system of the present invention, and each of the subtasks into which a weighing task is split is independently processed by means of each node of the weighing sensor network, thereby realizing the collaborative task processing capability of the weighing sensor network, and avoiding the communication bottleneck, in the conventional weighing system, caused by information summarization from weighing sensors to a specific instrument, computer or sensor.

Meanwhile, in the collaborative processing mode of the weighing sensor network of the present invention, the weighing task is assigned to all the weighing sensors, which is equivalent to multi-machine hot backup. When a certain weighing sensor is unable to operate normally, the subtask undertaken by it can be shared by other weighing sensors with a certain negotiation mechanism without affecting the normal operation of the weighing and measuring system. Thus, the reliability of the system is also improved.

Moreover, the collaborative processing mode of the weighing sensor network of the present invention neither requires an instrument or computer, nor does it need to construct a specific weighing sensor. In addition, each of the subtasks can be dynamically assigned among different weighing sensors, so the tolerance level to environment of the weighing and measuring system can be effectively improved, and the cost of the entire system can be reduced.

Furthermore, by means of the present invention, splitting of the weighing task and assignment of the split subtasks to each node of the weighing sensor network can be customized as required, so that specific collaborative task processing modes can be customized and operate according to different application environments.

The implementations of the present invention are illustrated by way of example with the embodiments described below.

Embodiment 1

The weighing and measuring system shown in FIG. 1 comprises six weighing sensors 1, the six weighing sensors 1 form a ring weighing sensor network via a bus 2, software and hardware of each weighing sensor 1 are identical, and each weighing sensor 1 is also capable of executing partial processing of the weighing task in addition to signal acquisition and processing. In the prior art, the function of the processing of the weighing task is typically implemented by an instrument or computer.

Each weighing sensor 1 collaboratively complete the processing of the weighing task by communication via the bus 2. Specifically, in this embodiment, the operating process of the weighing and measuring system is as follows:

Step 101, a weighing task is split into 5-6 subtasks.

Step 102, the six weighing sensors 1 in the ring weighing sensor network determine, with a negotiation mechanism, an assignment rule of the five to six subtasks among the weighing sensors 1.

Step 103, each weighing sensor 1 to which the subtasks are assigned independently processes the obtained subtasks, and exchanges task data with each other through the ring weighing sensor network during processing, thereby completing the entire weighing task.

In this embodiment, since communication physical layers of all the weighing sensors 1 are connected together, as long as the inner failure of any one of the weighing sensors 1 does not affect the connection of the communication physical layers, it will not affect the collaborative communication between other weighing sensors 1.

For example, when each of the weighing sensors 1 processes the subtasks, operating states of the weighing sensors to which the subtasks are assigned are monitored in real time, and when failure of a weighing sensor assigned with a subtask is monitored, the subtask of the weighing sensor is reassigned to other weighing sensors in the ring weighing sensor network.

Embodiment 2

Figure 2:
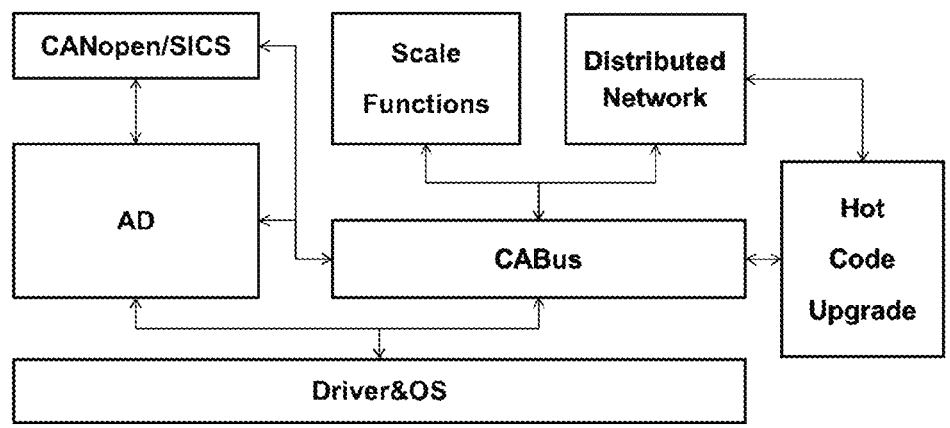
FIG. 2 is a schematic diagram of an embedded software framework burned in weighing sensors according to Embodiment 2 of the present invention.

The weighing and measuring system of this embodiment has the same structure as the weighing and measuring system of Embodiment 1, and an embedded software structure burned in a weighing sensor 1 of this embodiment is as shown in FIG. 2.

Driver&OS is an underlying driving and operating system of the embedded software, and directly supports AD, that is, a data acquisition module of the weighing sensor, and the AD module acquires data of the weighing sensor with a CANopen/SICS module. CABus is a virtual software bus in the embedded software, and is also directly supported by the Driver&OS.

A functional program module, Scale Functions module, which involves processing of all weighing tasks, is divided into a series of subprogram modules, and each subprogram module can operate independently on the software bus and exchange data.

Distribute Network is a distributed management module that is configured to coordinate assignment of a task among each of the weighing sensors 1 to determine the activation of a program sub-module that needs to be selected on the current weighing sensor 1, and to exchange data with the activated program sub-modules in other weighing sensors via the bus, so as to realize collaborative operation.

A Hot Code Update module is configured to determine, according to the information acquired by the distributed management module, an operating state or code of the program sub-module that needs to be updated in real-time operation.

In this embodiment, a virtual software bus is constructed in the embedded system of the weighing sensor, and the functional program module is segmented into a plurality of subtle independently operating program sub-modules to realize that the functional content comprised in the subtasks split from the weighing task can be collaboratively executed by a plurality of physically independent weighing sensors.

Moreover, in a variant of this embodiment, considering the granularity of segmentation of the functional program module subtly segmented into program sub-modules and the balance of operating efficiency of the software, the functional content contained in one or a number of subtasks may not be segmented, but directly assigned to the modules capable of executing the functional contents.

In addition, considering system security and performance optimization, in another variant, certain functional content is allowed to be repeatedly executed by different weighing sensors, and then based on the comparison principle, the most credible or optimal result is selected from each node of the ring weighing sensor network to be used as a data source for other processing results that require the functional content to be executed.

Therefore, this variant can realize redundant operation without affecting the overhead of hardware CPU (Central Processing Unit) and RAM (Random Access Memory).

With this variant, when a weighing sensor physically fails, the task undertaken by it is not affected, and is assigned to other weighing sensors in real time or processed by a weighing sensor that executes the task redundantly.

Furthermore, if a physical network of the metering system comprises a plurality, of weighing and measuring systems of this embodiment that are independent of each other, subtasks from a weighing task split by one weighing and measuring system can be independently executed among the plurality of different weighing and measuring systems through a communication network of the physical network, and task data is exchanged through the physical network of the metering system so as to complete the weighing task.

Such structure is particularly suitable for allowing, when a measuring system encounters too many sensor failures and cannot complete the measuring task, weighing sensors in other measuring systems to be added to the measuring system, and reassigning the task.

Embodiment 3

This embodiment further illustrates the principle and operating process of a weighing and measuring system with a four-point platform scale.

The four-point platform scale comprises four weighing sensors at four corners of the platform scale for measuring pressure values at the four corners of the platform scale. In this embodiment, the four weighing sensors constitute a ring weighing sensor network via a bus.

A weighing task executed by the four-point platform scale may be divided into the following content:

Filtration: filtering measured values from four measured points.

Generation of a weighing platform pressure value: generating a weighing platform pressure value by filter output.

Metering rule operation: converting the weighing platform pressure value into a weight value in a specified format according to a metering rule.

Output of weight data: outputting weight data according to a certain protocol.

Moreover, based on the actual needs and content requirements of task assignment, the division of the weighing task can be arbitrarily customized, and is not limited to the division in this embodiment.

The weighing and measuring operating process of this embodiment is as follows:

Step 201, four weighing sensors are powered on, a weighing service start-up signal is obtained in a start-up process, and each of the weighing sensors reads respective force measuring point serial number from a local memory.

Step 202, the four weighing sensors broadcast their force measuring point serial numbers in a ring weighing sensor network.

Step 203, the No. 1 weighing sensor with the minimum force measuring point serial number is selected to be used as a service preparation sensor, and a corresponding service preparation content is started up.

In this embodiment, the service preparation sensor may also be selected based on a rule such as selecting a maximum force measuring point serial number, and this embodiment does not limit the rule or method for selecting the service preparation sensor.

In this embodiment, after the service preparation sensor is selected, if the service preparation sensor is down, the No. 2 weighing sensor with the second minimum force measuring point serial number in the ring weighing sensor network is selected again to be used as a service preparation sensor, thereby maintaining the operation of the entire system, achieving seamless switching of sensors within the system from the user's point of view, and improving the sense of use.

Step 204, the service preparation sensor acquires all the force measuring point serial numbers (No. 1-4) in the ring weighing sensor network, and selects the weighing sensor with the force measuring point serial number 2 which is to be used as a service organization sensor according to the order from small to large.

In this embodiment, the service organization sensor may also be selected based on a rule such as selecting a maximum odd force measuring point serial number or a minimum load carrying capacity, and this embodiment does not limit the rule or method for selecting the service organization sensor.

In addition, after the service organization sensor is selected, if the service organization sensor is down, the service preparation sensor will select the weighing sensor with the force measuring point serial number 3 which is to be used as a service organization sensor to maintain the operation of the system, thereby improving the reliability of the system and achieving the sense of use of seamless switching.

Step 205, the service organization sensor splits a filtration task, a weighing platform pressure value generating task, a metering rule operation task, and a weight data output task according to the content of division of the weighing task as described above.

Step 206, the service organization sensor assigns the redundancy of the filtration task to the weighing sensors with the force measuring point serial numbers 1 and 2, assigns the weighing platform pressure value generating task to the weighing sensor with the force measuring point serial number 4, and assigns the metering rule operation task and the weight data output task to the weighing sensor with the force measuring point serial number 3.

In another embodiment, the four weighing sensors determine, based on the weighing sensor network, assigned objects of the divided tasks with a negotiation mechanism of the network, and the service organization sensor assigns the tasks.

It can be seen that the rule for assignment of the tasks can be freely defined, for example, the task is equally divided among the four weighing sensors according to the content of the task, etc., which is not limited to the assignment method of this embodiment.

Step 207, each of the weighing sensors respectively activates, according to the content of the received task, function program modules capable of executing the task content. For example, the weighing sensors with the force measuring point serial numbers 1 and 2 both activate function program modules capable of processing the filtration task.

Of course, all the function program modules in the weighing sensors may also be fully activated, but this not only increases the workload of the weighing sensors, but also increases the power consumption.

The function program modules may be activated by, for example, the division and activation method of the embedded software in Embodiment 2, or by division and activation methods as other types of customized function program module. This embodiment does not limit the division and activation method of the function program modules.

Step 208, the weighing task is started up, and the four weighing sensors collaboratively complete the weighing task.

Specifically, after the weighing task is split and assigned to the four weighing sensors through steps 201-207, and the weighing system receives an instruction of starting up the weighing task, the four weighing sensors first complete respective force measurement, and then the weighing sensors with the force measuring point serial numbers 1 and 2 respectively filter the four force measuring values and exchange the filtered data to the weighing sensor with the force measuring point serial number 4 through the weighing sensor network.

The weighing sensor with the force measuring point serial number 4 preferentially selects filtered data from the redundant filtered data, calculates a weighing platform pressure value, and then transmits the weighing platform pressure value to the weighing sensor with the force measuring point serial number 3 through the weighing sensor network.

The weighing sensor with the force measuring point serial number 3 converts the weighing platform pressure value into a weight value in a specified format according to a metering rule, and outputs the weight value to other external devices according to a certain protocol.

At this point, the four-point platform scale completes the weighing task. Under the premise that the content of the weighing task is unchanged, the four-point platform scale can repeatedly execute the weighing task without repeated task division and assignment.

Although the specific implementations of the present invention are described above, a person skilled in the art should understand that these are only exemplary, and the scope of protection of the present invention is defined by the attached claims. Various alterations or modifications to these implementations can be made by a person skilled in the art without departing from the principle and essence of the present invention; however, these alterations and modifications all fall within the scope of protection of the present invention.

The invention claimed is:

1. A weighing and measuring system, comprising:
a plurality of weighing sensors, arranged into a network of weighing sensors to perform a weighing task split into a plurality of weighing subtasks;
wherein there is a preset assignment rule whereby a serial number assigned to each of the plurality of weighing sensors is used to assign one of the subtasks to each of the weighing sensors for the assigned weighing sensor to execute, respectively and independently, the assigned subtask and to exchange task data through the weighing sensor network; and
wherein there is a preset selection rule, under which one of the weighing sensors is selected as a service preparation sensor to acquire a serial number of each of the weighing sensors.

2. The system of claim 1, further comprising:
a bus that networks to constitute the weighing sensor network.

3. The system of claim 1, wherein when any of the weighing sensors fails to perform its assigned subtask, the assigned subtask is assigned to another of the weighing sensors.

4. The system of claim 1, further comprising:
a preset splitting rule that splits the weighing task to obtain the subtasks.

5. The system of claim 1, wherein the preset assignment rule is a redundant assignment rule.

6. The system of claim 1, wherein the serial number of each of the weighing sensors is broadcast in the weighing sensor network.

7. The system of claim 1, wherein, when the selected service preparation sensor is down, another weighing sensor is selected according to the preset selection rule to be used as the service preparation sensor.

8. The system of claim 1, wherein the preset selection rule selects the weighing sensor with the minimum serial number as the service preparation sensor.

9. The system of claim 1, further comprising:
a preset rule under which the service preparation sensor selects a weighing sensor as a service organization sensor to execute splitting and assigning the weighing task, and to push the subtasks obtained by splitting to the corresponding weighing sensors.

10. The system of claim 9, wherein, when the service organization sensor is down, the preset rule is used by the service preparation sensor to select another weighing sensor to be used as the service organization sensor.

11. The system of claim 1, further comprising:
a preset negotiation mechanism that determines the assignment rule is determined for each of the weighing sensors in the weighing sensor network according to a preset negotiation mechanism, and each of the subtasks is assigned to the weighing sensor with the corresponding serial number according to the assignment rule.

12. The system of claim 1, further comprising:
in each weighing sensor to which a subtask is assigned, a functional module that activates the weighing sensor, so that the weighing sensor independently executes the assigned subtask and exchanges task data with other weighing sensors through the weighing sensor network;
wherein the functional module corresponds to the assigned subtask.

13. A metering system, comprising:
at least two weighing and measuring systems according to claim 1, each of the weighing and measuring systems being communicatively connected to constitute a metering system network.

14. The metering system of claim 13, wherein:
any of the at least two weighing and measuring systems is capable of assigning some of the subtasks into which a weighing task is split to other weighing and measuring systems for processing, and exchanging task data through the metering system network.

* * * * *